(No Model.)

P. A. N. WINAND.
STEAM GENERATOR FOR WHISTLES.

No. 584,445. Patented June 15, 1897.

WITNESSES:
C. E. Ashley
I. H. W. Lloyd.

INVENTOR:
Paul A. N. Winand
By his Attorneys
Baldwin, Davidson & Wight

UNITED STATES PATENT OFFICE.

PAUL A. N. WINAND, OF PHILADELPHIA, PENNSYLVANIA.

STEAM-GENERATOR FOR WHISTLES.

SPECIFICATION forming part of Letters Patent No. 584,445, dated June 15, 1897.

Application filed January 13, 1896. Serial No. 575,366. (No model.)

*To all whom it may concern:*

Be it known that I, PAUL A. N. WINAND, a subject of the King of Belgium, residing at Philadelphia, in the county of Philadelphia and State of Pennsylvania, have invented certain new and useful Improvements in Steam-Generating Attachments for Internal-Combustion Engines, of which the following is a specification.

The object of this invention is to provide an internal-combustion engine, as a gas-engine, with a steam-whistle attachment the operating energy of which will be derived from the engine itself when in operation.

The apparatus is to be used in connection with stationary, marine, or locomotive engines.

The main features of the invention are a steam-generator preferably heated by the exhaust-gases of the engine, a closed water vessel connected to the steam-generator and to the combustion-chamber of the engine, whereby the pressure of the gases from the combustion-chamber is utilized to force the water from the water vessel into the steam-generator, and a steam-whistle connected to the steam-generator. The subservient devices consist of a check-valve located in the connection between the combustion-chamber of the engine and the water vessel to prevent the backflow of the gases under pressure from the water vessel to the combustion-chamber, a cock or valve in the pipe connection between the water vessel and the steam-generator to admit of the water under pressure from the gas above it being forced into the steam-generator when steam is required to operate the whistle, and a pressure retaining and liberating device located between the steam-generator and the whistle, said device being of such a nature as to retain the steam in the generator until sufficient pressure for the purpose required is attained and then to act to afford a free passage for the steam from the generator to the whistle or to any other appliance requiring a limited quantity of steam for its operation that may be substituted therefor.

To more fully describe the construction and operation of my invention, I will now refer to the drawings forming part of this specification, in which—

Figure 1:
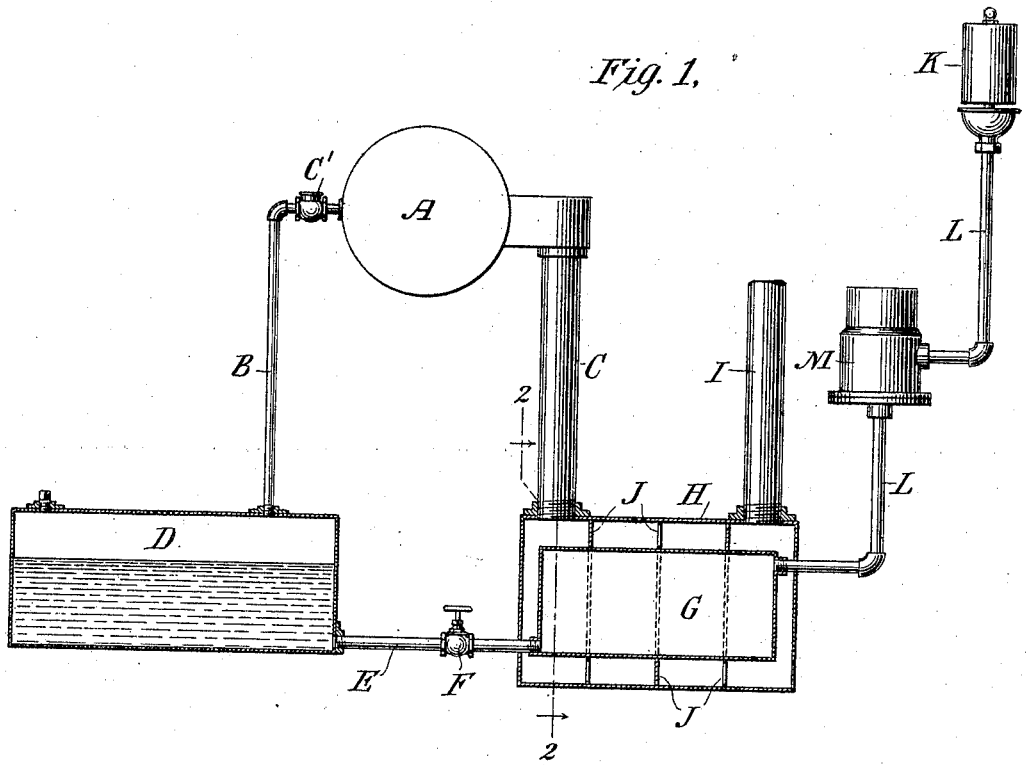
Figure 2:
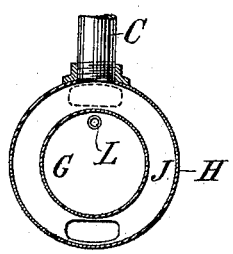
Figure 3:
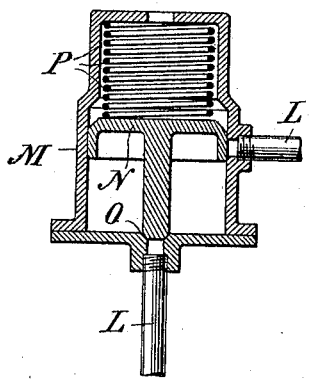

Figure 1 shows an arrangement of the various parts of my invention combined to produce the desired result. Fig. 2 is a transverse section of the steam-generator on the line 2 2 of Fig. 1, and Fig. 3 is a sectional view of the steam retaining and liberating device.

In Fig. 1, A represents an end view of an internal-combustion engine, B a pipe leading from the combustion-chamber thereof, and C the exhaust or pipe through which the exploded gases pass from the engine after expending their expansive energy therein.

The closed vessel D is, as shown, provided with water. It is connected to the pipe B, and in this pipe is placed a check-valve C, which is of the ordinary construction. From the water-space of the vessel D extends the pipe E, provided with a stop-cock or valve F, and this pipe E joins the vessel D to the steam-generating vessel G, which is inclosed in the drum or jacket H. It may be advantageous in some cases to provide other means for creating a pressure above the water in the vessel D—as, for instance, an air-pump may be used, operated by the engine or otherwise—the requirement being that pressure from an elastic medium be applied to the surface of the water in said chamber, so as to force the water therefrom as it is required. The exhaust-pipe C communicates with this drum at one end thereof, and the other end of it is provided with the discharge-pipe I. To insure a proper circulation of the exhaust-gases around the steam vessel G, so that their heat may be duly utilized, a series of plates or diaphragms J J may be placed in the jacket H, the alternate plates having openings at their upper and lower parts, or any interior formation of the jacket or construction of the steam-generator may be adopted to properly utilize the waste heat of the engine's exhaust.

The steam-whistle K is connected by the pipe L to the steam-generating vessel G, and in this pipe is located the pressure retaining and liberating device. The construction of a device of this character well adapted for the purpose is shown in sectional view at Fig. 3, the same consisting of a case M, having a valve-seat formed in its lower part, to the opening of which the pipe from the generator communicates, and a piston N, fitted to slide in the case M and having a stem with a valve O, arranged to close the valve-seat in the bottom of the case. The side of the piston N, when the valve is on its seat, covers the opening in the side of the case which is in communication with the whistle K, and a spring P is located between the piston and the top of the case, said spring being of such a strength or adjusted to keep the valve O on its seat until the desired working pressure of the steam in the generator is attained. It will be observed that by reason of the piston N having greater area than the valve O when the steam-pressure rises sufficiently to raise the valve O it acts immediately on the piston N, fully opens the valve, and exposes the opening to the whistle, and so affords a free passage of the steam to the whistle.

Now when it is desired to operate the whistle or other device the steam is intended to actuate, the valve F in the pipe E is opened, thus allowing water from the vessel D to enter the steam-generator G, the pressure of the gases above the water in the vessel D being such as to force water into the generator against the working pressure of the steam in amount sufficient for the purpose for which the apparatus may be designed, and the steam escapes from the generator in the manner before described to actuate the device at the end of the pipe L.

I claim as my invention—

1. In a steam-whistle attachment for internal-combustion engines, the combination of the combustion-chamber of the engine, a closed water vessel, the pipe connecting the combustion-chamber and the water vessel, a steam-generator, a pipe connecting the steam-generator and the water vessel, a steam-whistle, and the pipe connecting the steam-generator and the whistle.

2. In a steam-whistle attachment for internal-combustion engines, the combination of the combustion-chamber of the engine, a closed water vessel, the pipe connecting the combustion-chamber and the water vessel, a steam-generator, the pipe connecting the steam-generator and the water vessel, a steam-whistle, a pipe connecting the steam-generator and the whistle, and an automatic pressure retaining and liberating device in this last-named pipe.

3. In a steam-whistle attachment for internal-combustion engines, the combination of the combustion-chamber of the engine, a closed water vessel, the pipe connecting the combustion-chamber and the water vessel, a steam-generating vessel, a drum or jacket surrounding the same included in or forming part of the exhaust passage or pipe of the engine, the pipe connecting the steam-generating vessel and the water vessel, a steam-whistle, and the pipe connecting the steam-generating vessel and the whistle.

4. In a steam-generating attachment for internal-combustion engines, the combination of the engine, a steam-generating vessel heated by the exhaust from the engine, a closed water vessel connected by a pipe to the steam-generating vessel, means for creating pressure in the water vessel from an elastic medium, and a steam-using appliance connected by a pipe to the steam-generating vessel.

5. In a steam-generating attachment for internal-combustion engines, the combination of the engine, a steam-generating vessel, a drum or jacket surrounding the same, the engine exhaust-pipe connected to said drum, a closed water vessel connected by a pipe to the steam-generating vessel, a valve in this pipe, means for creating pressure in the water vessel from an elastic medium, a steam-using appliance connected by a pipe to the steam-generating vessel, and a pressure retaining and liberating device in this pipe.

In testimony whereof I have hereunto subscribed my name.

PAUL A. N. WINAND.

Witnesses:
R. S. REED,
ISAIAH MATLACK.